United States Patent [19]

Cuomo et al.

[11] 4,358,291

[45] Nov. 9, 1982

[54] SOLID STATE RENEWABLE ENERGY SUPPLY

[75] Inventors: Jerome J. Cuomo, Lincolndale; Jerry M. Woodall, Bedford Hills, both of N.Y.

[73] Assignee: International Business Machines Corporation, Armonk, N.Y.

[21] Appl. No.: 221,650

[22] Filed: Dec. 31, 1980

[51] Int. Cl.$^3$ .......................... C10L 3/00; C01B 1/07; C25C 3/06

[52] U.S. Cl. ...................... 44/3 B; 204/67; 204/70; 423/657; 423/658

[58] Field of Search ................ 44/3 R, 3 B; 423/657, 423/658; 204/67, 70

[56] References Cited

U.S. PATENT DOCUMENTS

| | | | |
|---|---|---|---|
| 527,848 | 10/1894 | Gooch et al. | 204/67 |
| 2,847,387 | 8/1958 | Smith | 252/466 |
| 3,055,736 | 9/1962 | Bécue | 23/141 |
| 3,135,672 | 6/1964 | Hirakawa et al. | 204/67 |
| 3,348,919 | 10/1967 | Shumway | 23/211 |
| 3,540,854 | 11/1970 | Brooke, Jr. et al. | 23/282 |
| 4,126,525 | 11/1978 | Wakaizumi et al. | 204/67 |
| 4,289,744 | 9/1981 | Anderson | 423/657 X |

FOREIGN PATENT DOCUMENTS 137783  7/1975  Japan .................................. 423/657

OTHER PUBLICATIONS

Science, Jul. 1974, vol. 185, No. 4148, pp. 311–319.
Road & Track, Mar. 1974, pp. 63–67.

*Primary Examiner*—Carl F. Dees
*Attorney, Agent, or Firm*—Alvin J. Riddles

[57] ABSTRACT

A solid state renewable energy supply is provided by the oxidation of a passivating oxide forming solid state material in the presence of oxygen under the control of a passivating oxide preventing agent forming thereby an oxide reaction product, heat and hydrogen. The oxide reaction product is then electrolytically or thermo chemically reduced to recover the solid state material. Aluminum is hydrolized in the presence of gallium producing aluminum oxide, heat and hydrogen. The aluminum oxide is in turn electrolyzed back to aluminum.

5 Claims, 1 Drawing Figure

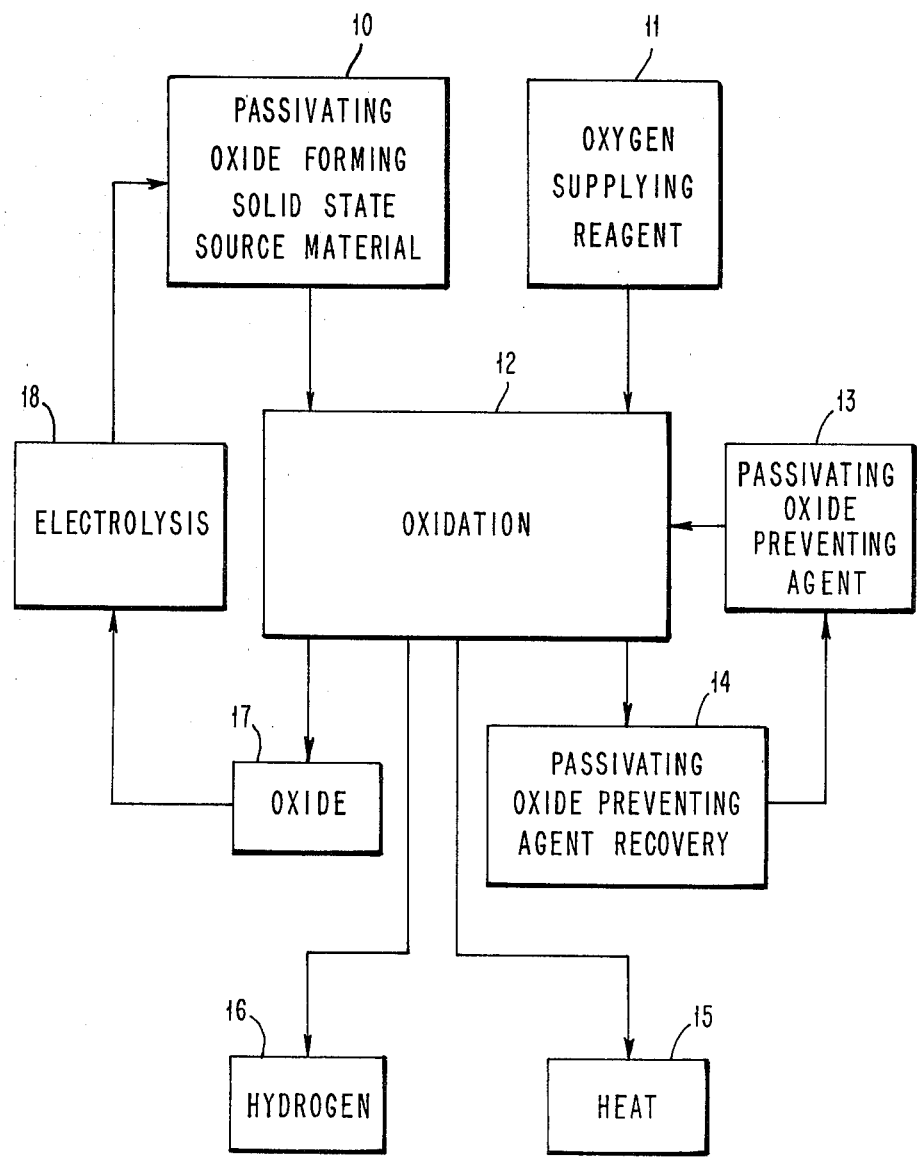

SOLID STATE RENEWABLE ENERGY SUPPLY

DESCRIPTION

1. Technical Field

The technical field of the invention is that of the production of sources of energy.

A broad search is under way for sources of energy that are ecologically attractive, broadly usable, easily stored and transported and which can be produced from a virtually inexhaustible feed stock. Materials in the solid state are usually easily stored and transported but they do not release energy easily or controllably. Gases and fluids generally release the energy more easily and with greater control but the reaction products are frequently detrimental and they are difficult to store and transport.

2. Background Art

The art has been developing an appreciation of a two-stage supply wherein a solid state material produces a gaseous energy source. The gas hydrogen is a potentially highly flexible energy medium that has very few ecologically undesirable qualities and the generation and storage of hydrogen has received substantial attention in the art.

One advantage of hydrogen is that it can be produced by a chemical reaction that employs as a supply material, an easily stored and transported solid. There exist a number of methods in the art for the production of hydrogen both directly and as a byproduct using chemical reactions.

Usually the chemical reaction used to produce the hydrogen is enhanced by employing an agent performing as a catalyst. As examples of such catalytic enhanced hydrogen producing reactions the use of mercury as a catalyst for the oxidation of aluminum is set forth in U.S. Pat. No. 3,540,854 and the use of an organic catalyst in the formation of hydrogen from one of a series of metals including aluminum is set forth in U.S. Pat. No. 3,348,919.

As the development of energy sources continues, the advantages in storage and in thermal efficiency that are to be gained by a closed cycle wherein at least one reaction product is recycled back to the original material are being proposed. A background article from *Science Magazine*, July 26, 1974, Vol. 185, page 311, describes the thermodynamics of closed cycle thermochemical processes for the production of hydrogen.

The art thus far, however, has the limitation that the energy sources addressed all have an unused reaction product and hence all have limited thermal efficiency.

DESCRIPTION OF THE DRAWING

The FIGURE is a flow chart of the solid state renewable closed cycle energy supply.

DISCLOSURE OF THE INVENTION

Solid state materials that form passivating oxides can be controllably oxidized in the presence of a passivating oxide inhibiting agent to produce energy in the form of heat and hydrogen and the oxide reaction product in turn can be chemically reduced by electrolysis to the original solid state material using energy input from a plentiful source such as hydroelectric or solar energy.

A particularly thermally efficient closed cycle renewable energy source is provided for the production of hydrogen and heat by using as the solid state source a material that releases some energy in a controlled oxidation type reaction while providing an oxide product that can be converted back to the original source material by a reduction type reaction compatible with the availability of inexpensive power.

A thermally efficient close cycle renewable energy source is provided wherein a solid state material that in the presence of the atmosphere acquires a passivating coating and which, when reacted with a reagent that supplies oxygen under control of a passivating coating preventing agent loses the imperviousness of the passivating coating and oxidizes forming hydrogen and an oxide as reaction products while giving up heat. The passivating oxide preventing agent should dissolve a significant amount of the solid state material at room temperature yet the agent itself should not be significantly consumed in the oxidation reaction of the source material. The performance of the oxidation promoting material in this respect is somewhat similar to that of a catalyst. The function of the passivating oxide preventing agent is primarily that of prevention of an impervious coating of a passivating oxide over the source material.

The oxygen supplying reagent should be composed of at least oxygen and hydrogen and be such that reaction products formed in liberating the oxygen and hydrogen do not inhibit the reaction. If the oxygen is supplied exothermically it will add to the thermal efficiency whereas if the oxygen is supplied endothermically the heat required will detract from the overall thermal efficiency.

The solid state source material, the passivating oxide prevention agent and the oxygen supplying reactant are interdependent and are chosen for efficiency as a combination.

In accordance with the invention, it has been found that there is a group of materials that will oxidize at a low or even room temperature but which forms an impervious or passivating oxide which inhibits reaction, thereby making them easily handled as fuel sources. Such materials, when partially dissolved by an agent that prevents the impervious or passivating nature of the oxide, will quite controllably react with a source of oxygen under readily achievable ambient conditions to produce heat, hydrogen, a recovery of the passivating oxide preventing agent and an oxide reaction product. The oxide reaction product is then returned to the original solid state material by electrolytic chemical reduction and such a process is particularly compatible with photovoltaic and hydroelectric power sources.

Elements such as aluminum and magnesium will serve as solid state materials. The preferred material aluminum, and also magnesium are reacted under the control of gallium or a gallium-indium alloy with water to oxidize the aluminum or magnesium to an oxide product liberating both hydrogen and heat. The preferred embodiment aluminum oxide reaction product which, for convenience, will be referred to as aluminum oxide $Al_2O_3$ is then electrolytically reduced back to aluminum using an abundant or inexpensive source of energy such as solar energy.

In accordance with the invention, an energy supply is provided. It is renewable in that a closed thermochemical cycle is employed which controllably oxidizes at room temperature a solid material which liberates heat and hydrogen and produces an oxide which is then reconverted to the original solid through electrolytic or thermochemical reduction employing energy sources which, while inexpensive, are available only under limited conditions.

As examples of solid state materials useable in the invention, the reactive metals that form impervious passivating oxides will react controllably at room temperature with a water or alcohol reagent when under the control of a passivating oxide preventing agent that dissolves a portion of the reactive metal and prevents the passivating action of the oxide.

Referring to the FIGURE, a source of solid state material 10 that oxidizes in the atmosphere at a low temperature and a source of a reagent 11 that can supply oxygen are brought together in an oxidation reaction in a container 12 in the presence of a passivating oxide preventing agent 13. The material 10 forms an oxide 15 coating on the surface thereof which completely passivates and inhibits further activity. The passivating oxide preventing agent 13 dissolves a portion of the material 12 preventing oxide formation and permits oxidation in container 12 without application of significant external heat. In addition to the problems of ambient maintenance and control, any heat required to promote the reaction will contribute to reducing the thermal efficiency. There are four products: the recovered passivating oxide preventing agent 14, heat 15 and hydrogen 16 which are the cogenerated energy output and an oxide reaction product 17.

It should be noted that the technique of the invention cogenerates two different types of energy, each having separate characteristics so as to be compatible with different application and storage conditions as well as being capable of additive use.

The oxide 17 reaction product is then chemically reduced by electrolysis at a location 18 back to the original solid state material 10 and the heat generated at 18 is available for efficient thermal output.

The resulting closed cycle provides the energy output in a non-polluting form, as products of a controlled reaction which liberates the heat and hydrogen and the oxide reaction product is of a type that may be reconverted to the original solid state raw material under conditions that can employ an inexpensive energy source such as solar or hydroelectric energy that while plentiful has limited flexibility such as time of availability.

BEST MODE FOR CARRYING OUT THE INVENTION

There are a number of ingredients which can be employed in connection with the renewable closed energy generation cycle of the invention wherein the energy release from a solid state material is a controlled oxidation reaction and the regeneration of the reaction product oxide back to the original material is by a chemical reduction reaction such as electrolysis which is compatible with a plentiful but marginally controllable source of energy.

Relatively abundant elements that have relatively high negative oxide free energies and which have a native oxide that is highly passivating, will provide a good source of solid state energy materials. The reaction metals such as aluminum and magnesium and the element silicon are members of such a group.

The preferred embodiment for controllability of the reaction, for the production of high energy efficiency and for minimal generation of environmentally deleterious products is that of aluminum hydrolytic oxidation followed by a solar energy supplied electrolytic reduction. The hydrolytic oxidation reaction is controlled by gallium or a gallium-indium alloy serving as a passivating oxide preventing agent.

The hydrolytic oxidation reaction involves the use of aluminum as the solid state material 10 in a solution of water 11 in the vessel 12. The passivating oxide preventing agent 13 is slightly but insignificantly consumed, the bulk being available at 14 for reuse.

The reaction in the vessel 12 produces as energy components, heat 15 and hydrogen 16 for use in typical energy applications. The consumed aluminum 10 becomes an oxide 17 which may be $Al_2O_3$, $Al(OH)_3$ or $Al(OOH)$ and will be referred to as aluminum oxide $Al_2O_3$ for convenience. Most oxide reaction products are abundant in nature and have relatively low economic value.

Since the reaction ingredients are interdependent in the achievement of thermal efficiency, safety, controllability and generation of deleterious products, there will be optimal combinations of solid state source material, oxygen supplying reagent and passivating oxide prevention agents. In the preferred embodiment aluminum, water and gallium is such a combination.

In the preferred embodiment using aluminum as the solid state source 10, water serves as the oxygen supplying reagent 11, and for the passivating oxide preventing agent 13, it has been found that gallium and the gallium-indium alloy have highly desirable characteristics both thermally and from a pollution standpoint. The gallium and the gallium-indium alloy dissolves aluminum readily at room temperature and thus the reaction will occur at a lower temperature. Further, the gallium and alloy mixtures of indium and gallium do not appreciably react in the hydrolytic reaction in the container 12, therefore, and are not appreciably diminished in the formation of the aluminum oxide 17.

The recoverability of the gallium would be such that about 0.02 grams of gallium will be lost for the complete consumption of approximately ½ gram of aluminum so that the recovered passivating oxide prevention agent at 14 in the FIGURE will require an additional external supply introduced at 13 for continuous reaction and energy release.

The gallium and gallium-indium alloys have approximately 9 atomic % solubility of aluminum, they also have a low vapor pressure which provides a wide ambient temperature range for the hydrolytic reaction. For prolonged energy generation the preventing agent 13 is supplied to the aluminum 10 at the rate of consumption.

The process for the controlled oxidation of Al as the solid state material 10, using water as the oxygen supplying reagent 11, and using Ga as the passivating oxide inhibitor 13, has a number of chemical and thermochemical aspects as set forth in Equations 1, 2 and 3 with a portion of the total heat 15 released in each. Equation 1 describes the reaction in container 12, Equation 2 describes the heat gained in using the hydrogen 16 and Equation 3 describes heat liberated in the electrolysis at 18.

Equation 1: $2\ Al + 3\ H_2O \rightarrow Al_2O_3 + 3\ H_2 + Heat$ wherein $\Delta H = 1 \times 10^5$ cal./mol. of aluminum.

Equation 2: $2\ H_2 + O_2 \rightarrow 2\ H_2O$ with $\Delta H = to\ 1 \times 10^5$ cal./mol. of aluminum.

Equation 3: $Al^{+3} + 3e^- \rightarrow Al$  $\Delta H = 1.6 \times 10^2$ watt hrs./mol. of aluminum.

While in the light of the accompanying teachings and the principles set forth, it will be apparent to one skilled in the art that there will be many specific materials that will fit within applicants' closed thermochemical cycle energy process wherein a solid state material 10 is controllably oxidized in a container 12, liberating heat 15 and, hydrogen 16, and the oxide reaction product 17 is then reconverted to the original solid state material 10 using a reduction reaction 18 compatible with a plentiful type of external energy that is subject to limited control.

The following specific example is provided to assist one skilled in the art in practicing the invention.

A reaction in accordance with Equation 1 is selected such that for an initial weight of gallium in grams of 19.916 and an aluminum weight of 0.466 grams for a total weight of 20.382 grams in the presence of 54 grams of water at room temperature; at the end of 72 hours, the gallium weight will be 19.895 grams while the aluminum will have been fully consumed. The result is that the total gallium recovered is 19.895 grams. The reaction fully consumes the 0.466 grams of aluminum and consumes 0.021 grams of gallium. There are 400 cc of hydrogen 16 produced and $1.85 \times 10^3$ calories of heat 15.

The heat that would be liberated from consumption of the hydrogen 16 is in accordance with Equation 2 and is $1.85 \times 10^3$ calories for the approximately ½ gram aluminum that was consumed.

For a closed cycle there is also an electrical input as set forth in Equation 3 required to take the aluminum oxide back to the aluminum. The input energy is approximately 3 watt hours to reconvert the aluminum oxide back to the approximately ½ gram of aluminum that was consumed.

The heat released as described by Equations 1 and 2 will be $3.7 \times 10^3$ calories coming out for the approximately ½ gram of aluminum consumed.

For an appreciation of the cyclic efficiency, the $3.7 \times 10^3$ calorie output value, however, should be divided by the 3 watt hours from Equation 3 that are put into the cycle at 18 for the portion where the aluminum oxide 17 is reconverted to aluminum 10. The entire cycle may be thermally described as Equations 4A for heat 15 and 4B for hydrogen 16 to heat.

Equation 4A: $Al \rightarrow Heat + Al_2O_3 \rightarrow Al$ $$\Delta H \text{ for the cycle} = \frac{1.85 \times 10^3 \text{ calories out}}{3 \text{ watt hours in}}.$$

Equation 4B: $Al \rightarrow H_2 \rightarrow H_2O + \Delta + Al_2O_3 \rightarrow Al$ $$\Delta H \text{ for the cycle} = \frac{1.85 \times 10^3 \text{ calories out}}{3 \text{ watt hours in}}.$$

The combined energy total from Equations 4A and 4B is $3.7 \times 10^3$ calories out per 3 watt hours in.

In order to permit one skilled in the art to evaluate the selection of materials in practicing the invention the following economic considerations are set forth for the aluminum-gallium-water preferred example.

As an economic illustration, assuming a plentiful type of energy supply at the container 18 to be 3 cents per kilowatt hour, which is typical of present day cost of hydroelectric energy. The energy out would then be $2 \times 10^7$ calories per dollar for the portion of the cycle involving oxidation hydrolysis producing heat and aluminum oxide. For the portion of the cycle involving the converting of the hydrogen 16 to heat, the energy out is $2 \times 10^7$ calories per dollar. The combined energy total is $4 \times 10^7$ calories per dollar.

When it is considered that oil delivers $3 \times 10^7$ calories per gallon and with an assumption that oil at this point in time is $1.00 per gallon, then the closed cycle of the invention involving a solid state material controllably oxidized liberating heat and hydrogen with a subsequent reduction reaction using electrolysis returning the oxide to the original solid state material will give a substantial improvement over the use at present day cost of a fossil fuel such as oil.

While the invention has been particularly shown and described with reference to a specific embodiment, it will be understood by those skilled in the art in the light of the principles set forth that a wide variety of materials and specific values may be employed without departing from the spirit and scope of the invention.

Having thus described our invention, what we claim as new, and desire to secure by Letters Patent is:

1. The process of providing energy in the form of heat and hydrogen comprising in combination the steps of:

reacting in an oxidation type of reaction a source of a passivating oxide forming solid state material and an oxygen supplying reagent composed of at least oxygen and hydrogen in the presence of an agent inhibiting said passivating oxide, producing thereby hydrogen gas, heat, and an oxide of said solid state material as reaction products;

recovering and recycling said passivating oxide inhibiting agent; and recovering and recycling in a chemical reduction type of reaction said oxide of said solid state material reaction product.

2. The process of claim 1 wherein said oxidation reaction step is hydrolyzing and wherein said reduction reaction step is electrolysis.

3. The process of claim 2 wherein said passivating oxide forming solid state material is taken from the group of aluminum and magnesium.

4. The process of claim 3 wherein the ingredients in said oxidation type of reaction are aluminum, water and at least one of gallium and a gallium-indium alloy.

5. In a process of providing a renewable source of energy employing the oxidation of a source material the improvement comprising chemically reducing the oxide reaction produce back to said source material and including the utilization of both the cogenerated heat and hydrogen liberated by said oxidation.

* * * * *